Patented Aug. 13, 1940

2,211,468

UNITED STATES PATENT OFFICE 2,211,468

LIQUID COATING FOR GAS FILTERING MEDIUMS

William J. Marsh, Niagara Falls, N. Y., assignor to Hooker Electrochemical Company, New York, N. Y., a corporation of New York No Drawing. Application October 8, 1938, Serial No. 233,977

5 Claims. (Cl. 134—11)

The object of my invention is to supply a coating composition for the permeable screens of gas filters, and more particularly for air filters, combining in the highest degree the properties which experience has shown to be desirable in such compositions. Among these properties are the following: The composition must be a non-volatile, thick, viscous, tacky liquid, which will coat glass wool or metals without draining off, or saturate paper or other fibrous material. It must have superior wetting or absorbing power for dust particles and must retain this power without drying or hardening under exposure to the atmosphere for an indefinite period. It should also be non-inflammable and preferably flame quenching. It must not be a culture medium for bacteria. It must also be substantially odorless. My coating composition has all these properties in high degree.

Among the materials which are suitable for my purpose are certain non-volatile, non-drying, viscous, substantially odorless, chlorinated organic compounds such as may be produced by chlorinating certain esters to a degree that leaves the product in a viscous state.

Among the materials I have found to be best suited to my purpose are the chlorinated methyl, ethyl, propyl, butyl and phenyl esters of aromatic acids. The unfractionated, partially chlorinated phenyl esters of aromatic acids having chlorine in both carbon rings are mixtures of a very large number of isomers and exhibit greater fluidity than if they were chemical individuals. In copending application Serial No. 231,613, filed September 24, 1938, by Kimball and Loverde, there are disclosed certain chlorphenylbenzoates having properties which I have found to be very desirable for my purpose. I refer more especially to the pentachlorphenylbenzoate, produced by condensing a mixture of chlorphenol isomers averaging 3½ atoms of chlorine per molecule with chlorbenzoyl chloride isomers averaging 1½ atoms of chlorine per molecule. This material is a non-volatile, very viscous, tacky liquid, water insoluble but freely miscible with numerous aromatic and aliphatic solvents, e. g., petroleum oils, vegetable oils, hydrogenated fats, etc. Although not a saturated body, it will not dry by oxidation. It will not crystallize upon standing indefinitely, nor lose its tacky character under any ordinary conditions. It has an equal number of hydrogen and chlorine atoms and is capable of evolving five molecules of hydrogen chloride per molecule of the material, hence is highly flame resistant.

These chlorinated organic compounds are good wetters of fine particles, even though they be metallic. In fact, it is well known that such compounds when added to mineral lubricating oils increase the load carrying capacity of the oil through their affinity for metallic surfaces.

It is also well established that chlorinated organic compounds in general have pronounced fungicidal and bactericidal properties, a fact which precludes their acting as mediums for growth of germs and spores.

It is well known that hydrogen chloride gas has very marked flame damping and extinguishing properties, but in order to increase the flame quenching effect, I may incorporate with these chlorinated organic compounds a minor quantity of a finely divided carbonate, such as calcium carbonate or sodium carbonates, in which term I intend to include sodium bicarbonate. Upon heating, the latter gives off carbon dioxide and water vapor, becoming thereby transformed to $Na_2CO_3$. This then reacts with the hydrogen chloride evolved by the chlorinated organic compound, liberating more carbon dioxide and more water vapor, both of which are of course completely oxidized compounds and, therefore, effective fire-extinguishing agents. A further advantage of the admixture of a carbonate with the chlorinated organic compound is that the hydrogen chloride fumes given off by the latter when heated are neutralized.

The organic salts above mentioned are sometimes referred to as esters. However, according to the best authorities, an ester is a product obtained by reacting an alcohol with an organic acid. In the present specification and accompanying claims the term is used in that sense.

I claim as my invention:

1. A composition for coating the permeable screen of gas filters comprising a permanently viscous mixture of chlorphenyl chlorbenzoates.

2. A composition for coating the permeable screen of gas filters comprising a permanently viscous mixture of chlorphenylchlorbenzoates having an average of five chlorine atoms per molecule.

3. A composition for coating the permeable screen of gas filters comprising pentachlorphenylbenzoate having an average of 3½ atoms of chlorine per molecule in the carbon ring of the phenyl group and 1½ atoms of chlorine per molecule in the carbon ring of the benzoyl group.

4. A composition for coating the permeable screen of gas filters comprising a permanently viscous mixture of chlorphenyl chlorbenzoates mixed with a finely powdered carbonate.

5. A composition for coating the permeable screen of gas filters comprising a permanently viscous mixture of chlorphenyl chlorbenzoates mixed with finely powdered sodium carbonate.

WILLIAM J. MARSH.